United States Patent [19]

Weyer et al.

[11] Patent Number: 5,416,240
[45] Date of Patent: May 16, 1995

[54] PREPARATION OF POLOXY-ALKYLENE GLYCOLS

[75] Inventors: Hans-Juergen Weyer, Mannheim; Rolf Fischer, Heidelberg; Gerhard Jeschek, Gruenstadt; Franz Merger; Herbert Mueller, both of Frankenthal, all of Germany

[73] Assignee: BASF Aktiengesellschaft, Ludwigshafen, Germany

[21] Appl. No.: 24,903

[22] Filed: Mar. 2, 1993

Related U.S. Application Data

[63] Continuation of Ser. No. 843,819, Feb. 28, 1992, abandoned.

[30] Foreign Application Priority Data

Mar. 13, 1991 [DE] Germany ............... 41 08 044.0

[51] Int. Cl.$^6$ .................. C07C 41/01; C07C 41/02
[52] U.S. Cl. ..................... 568/617; 568/606; 568/607; 568/616; 560/103; 560/240
[58] Field of Search ........... 568/617, 606, 607, 616; 560/240, 103

[56] References Cited

U.S. PATENT DOCUMENTS

| | | |
|---|---|---|
| 3,358,042 | 12/1967 | Dunlop et al. |
| 3,712,930 | 1/1973 | Matsuda et al. |
| 4,608,422 | 3/1986 | Mueller . |
| 4,658,065 | 4/1987 | Aoshima et al. ............ 568/617 |
| 4,677,231 | 6/1987 | Aoshima et al. ............ 568/617 |
| 4,728,722 | 3/1988 | Mueller . |
| 4,943,626 | 7/1990 | McGrath et al. ............ 568/618 |

FOREIGN PATENT DOCUMENTS

| | | |
|---|---|---|
| 126471 | 11/1984 | European Pat. Off. . |
| 158229 | 10/1985 | European Pat. Off. . |
| 185553 | 6/1986 | European Pat. Off. . |
| 83028 | 5/1983 | Japan . |
| 105029 | 5/1988 | Japan ............ 568/617 |
| 917951 | 2/1963 | United Kingdom . |

OTHER PUBLICATIONS

Burwell, Chem. Rev. 54 (1954) p. 615.
Topics in Current Chemistry 76 (1978) 1.
Makromol. Chem. 190 (1989) 929.
L. Shedlovsky in A. Weissberger, B. W. Rossiter (Ed.): Techniques of Chemistry, vol. I, (1971) pp. 163–204.
Houben-Weyl, Methoden der organischen Chemie, vol. 4/2 (1955) pp. 318–322.

*Primary Examiner*—Howard T. Mars
*Attorney, Agent, or Firm*—John H. Shurtleff

[57] ABSTRACT

Polyoxyalkylene glycols are prepared by a process in which tetrahydrofuran is polymerized with a total of not more than 95 mol %, based on the amount of tetrahydrofuran used, of one or more comonomers from the group consisting of the cyclic ethers and acetals in the absence of water and in the presence of a monohydric alcohol or of a monocarboxylic acid with the aid of an anhydrous heteropoly acid catalyst, and the polyoxyalkylene glycol is liberated from the resulting polyoxyalkylene glycol monoethers or polyoxyalkylene glycol monoesters by cleavage of the monoether or monoester bond.

14 Claims, 1 Drawing Sheet

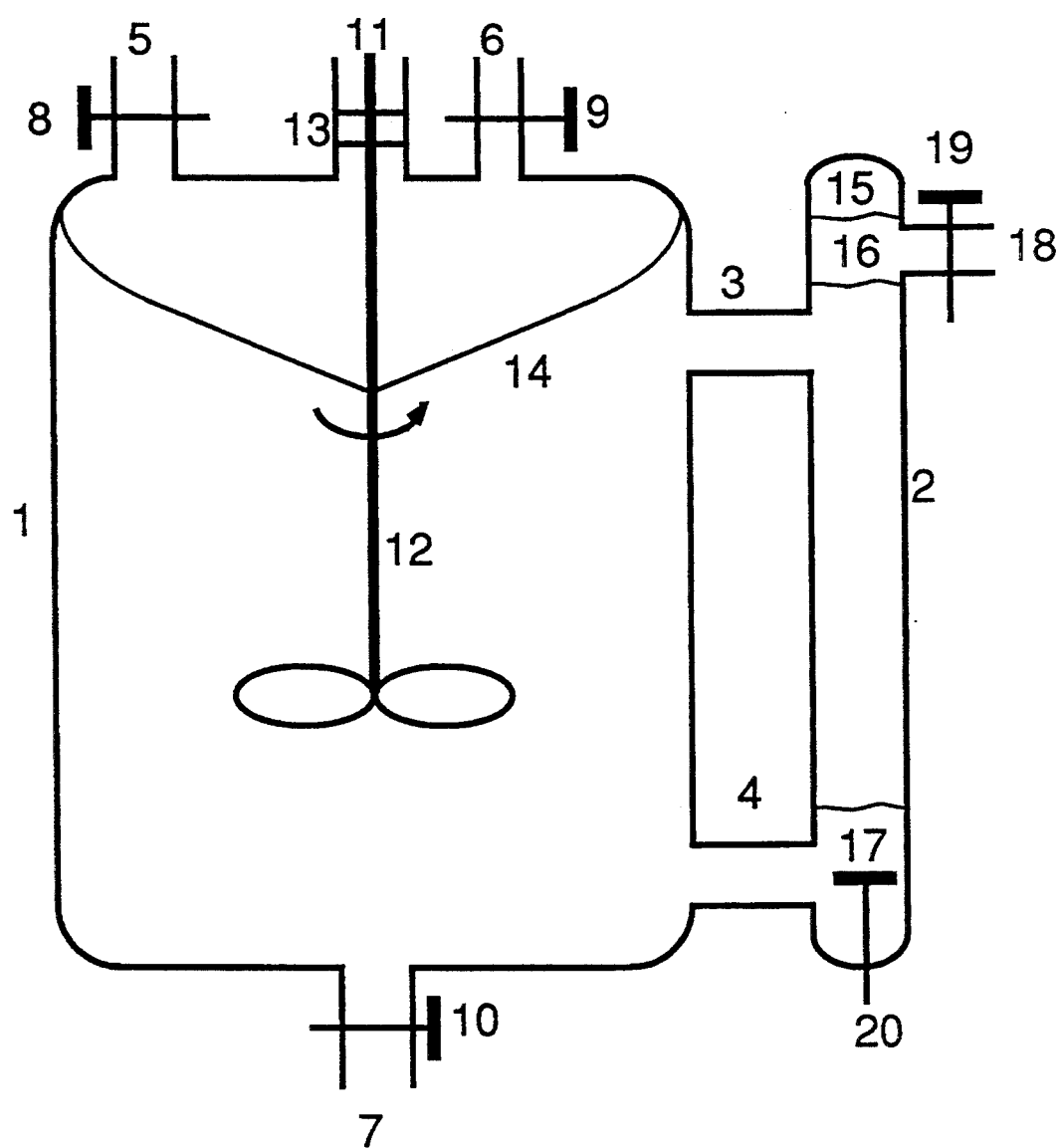

PREPARATION OF POLOXY-ALKYLENE GLYCOLS

This application is a continuation of application Ser. No. 07/843,819, filed Feb. 28, 1992 now abandoned.

The present invention relates to a process for the preparation of polyoxyalkylene glycols based on the tetrahydrofuran.

Polyoxyalkylene glycols, also known under the name polyether glycols, such as polyoxybutylene glycols, also referred to as polytetrahydrofurans (poly-THF), are prepared by cationic polymerization of cyclic ethers with the aid of Brönstedt or Lewis acid catalysts. For example, fluorosulfonic acid (U.S. Pat. No. 3,358,042) or fuming sulfuric acid (U.S. Pat. No. 3,712,930) is used as the Brönstedt acid. However, the polyoxyalkylene glycols prepared in this manner have the disadvantage that they are often discolored and their molecular weight distribution- is broad.

JP-A 83 028/1983 describes the polymerization of tetrahydrofuran (THF) in the presence of a carbonyl halide or an anhydride, a heteropoly acid being used under anhydrous conditions. However, poly-THF diesters are formed, the hydrolysis of which to poly-THF is more expensive. Since 2 mol of the relevant carboxylate or the relevant acid are liberated per mole of poly-THF in the hydrolysis, large amounts of these carboxylates enter the wastewater or, if this is to be prevented, must be recovered from the solutions containing the hydrolyzed products at great expense. This makes the process uneconomical.

According to EP-A 126 471, water-containing heteropoly acids are used as catalysts for the polymerization of THF to poly-THF. In this process, polyoxybutylene glycols having a narrow molecular weight distribution can be obtained directly. Usually, such a large amount of water is used that the heteropoly acid catalyst is present as the liquid phase. To carry out the polymerization, the organic THF phase and the aqueous heteropoly acid phase must be thoroughly mixed. To isolate the polyoxyalkylene glycols from the organic phase, the latter must first be separated off from the catalyst phase, which can then be reused. However, separation of the organic phase and the aqueous catalyst phase requires a relatively long time, and it is therefore necessary to use large volumes of liquid in a continuous form of this process in order to compensate for this deficiency, which in turn necessitates expensive apparatus. Another disadvantage of this process is that the aqueous heteropoly acid solutions used as a catalyst decompose after some time producing a dark color. These decomposition products or decomposition reactions caused by them in the organic phase lead to polyoxyalkylene glycols having a high color number.

Since polyoxyalkylene glycols, in particular poly-THF, are important starting materials for the preparation of resilient fibers, resilient structural materials and coatings, in particular those based on polyurethane, but the properties of these end products depend to a great extent on the properties of the polyoxyalkylene glycols used for their preparation, in particular on their average molecular weight, the molecular weight distribution (dispersity) and their color number, it is an object of the present invention to provide a process which permits the controlled preparation of polyoxyalkylene glycols, in particular polyoxybutylene glycols, having certain average molecular weights in the range from 500 to 3,500 dalton and having a very narrow molecular weight distribution in an economical manner without the disadvantages of the known processes occurring. The polyoxyalkylene glycols prepared in this manner should possess a low color number.

We have found that this object is achieved by a process for the preparation of polyoxyalkylene glycols based on tetrahydrofuran, wherein tetrahydrofuran or a mixture of tetrahydrofuran with a total of not more than 95 mol %, based on the amount of tetrahydrofuran used, of one or more comonomers from the group consisting of the cyclic ethers and acetals is polymerized in the absence of water and in the presence of a monohydric alcohol or a monocarboxylic acid with the aid of an anhydrous heteropoly acid catalyst, and the polyoxyalkylene glycol is liberated from the resulting polyoxyalkylene glycol monoether or polyoxyalkylene glycol monoester by cleavage of the monoether or monoester bond.

The polyoxyalkylene glycol monoethers or monoesters based on the monomer THF can, as far as their polyoxyalkylene glycol moiety is concerned, be prepared from THF or THF and cyclic ether and/or acetal comonomers by polymerization with ring cleavage. Examples are ethylene oxide, propylene oxide and other substituted epoxides, such as epichlorohydrin, 1,2-butylene oxide, 2,3-butylene oxide, isobutylene oxide, oxetane and oxetane derivatives, such as 3,3-dimethyloxetane, or 3,3-bischloromethyloxetane, 5-membered cyclic ethers and acetals, such as methyltetrahydrofurans, 1,3-dioxolan, 6-membered cyclic ethers, such as tetrahydropyran, 1,4-dioxane or 1,3-dioxane, 7-membered and higher-membered cyclic ethers, such as oxepan, crown ethers and cyclic oligomers of tetrahydrofuran. Mixtures of these comonomers with THF can of course also be polymerized.

In general, the comonomers are used in total amounts of not more than 95, preferably from 0.1 to 30, mol %, based on THF employed. In the novel process, however, poly-THF monoethers or monoesters of monohydric alcohols or monocarboxylic acids are particularly preferably prepared from the monomer THF alone.

For the purposes of the present invention, heteropoly acids are inorganic poly acids which have two or more different central atoms and are formed from weak, polybasic oxo acids of a metal, preferably from the oxo acids of chromium, of molybdenum, of vanadium or of tungsten and/or of the corresponding oxides of these metals, $CrO_3$, $MoO_3$, $V_2O_5$ or $WO_3$ and those of another metal or nonmetal, for example arsenic, boron, iodine, phosphorus, selenium, silicon, germanium or tellurium, as mixed, partial anhydrides. As a rule, the atomic ratio of the first-mentioned to the last-mentioned element in these heteropoly acids is from 2.5 to 12, preferably from 9 to 12.

Examples of heteropoly acids which can be used in the novel process are the following compounds:

Dodecamolybdatophosphoric acid ($H_3PMo_{12}O_{40} \cdot nH_2O$), dodecamolybdatosilicic acid ($H_4SiMo_{12}O_{40} \cdot nH_2O$), dodecamolybdatoceric (IV) acid ($H_8CeMo_{12}O_{42} \cdot nH_2O$), dodecamolybdatoarsenic (V) acid ($H_3AsMo_{12}O_{40} \cdot nH_2O$), hexamolybdatochromic (III) acid ($H_3CrMo_6O_{24}H_6 \cdot nH_2O$), hexamolybdatonickelic (II) acid ($H_4NiMo_6O_{24}H_6 \cdot tH_2O$), hexamolybdatoiodic acid ($H_5IMo_6O_{24} \cdot nH_2O$), octadecamolybdatodiphosphoric acid ($H_6P_2Mo_{18}O_{62} \cdot 11H_2O$), octdecamolybdatodiarsenic(V) acid ($H_6As_2Mo_{18}O_{62} \cdot 25H_2O$), nonamolybdatomanganic(IV) acid ($H_6MnMo_9O_{32} \cdot nH_2O$), undecamolybdatovanadatophosphoric acid ($H_4PMo_{11}VO_{40} \cdot nH_2O$), decamolybdatodivanadatophosphoric acid ($H_5Mo_{10}V_2O_{40} \cdot nH_2O$), dodecavanadatophosphoric acid ($H_7PV_{12}O_{36} \cdot nH_2O$), dodecatungstatosilicic acid ($H_4SiW_{12}O_{40} \cdot 7H_2O$), dodecatungstatophosphoric acid ($H_3PW_{12}O_{40} \cdot nH_2O$), dodecatungstatoboric acid ($H_5BW_{12}O_{40} \cdot nH_2O$), octadecatungstatodiphosphoric acid ($H_6O_2W_{18}O_{62} \cdot 14H_2O$), octadecatungstatodiarsenic(V) acid ($H_6As_2W_{18}O_{62} \cdot 14H_2O$) and hexamolybdatohexatungstatophosphoric acid ($H_3PMo_6W_6O_{40} \cdot nH_2O$). Of course, mixtures of heteropoly acids can also be used. In the novel process, dodecatungstatophosphoric acid, dodecamolybdatophosphoric acid, nonamolybdatophosphoric acid, dodecamolybdatosilicic acid and dodecatungstatosilicic acid are preferably used because they are readily available.

According to the invention, the free heteropoly acids are preferably used, but it is also possible to employ their salts, in particular their alkali metal and alkaline earth metal salts as catalysts. The heteropoly acids and their salts are known compounds and can be prepared by known processes, for example by the methods of Brauer (Editor): Handbuch der Präparativen, Anorganischen Chemie, Volume III, pp. 1774–1798, Enke, Stuttgart, 1981, or by the process described in Top. Curr. Chem. 76 (1978), 1.

The heteropoly acids prepared in this manner are generally in the hydrated form and, before being used in the novel process, are freed from the water contained therein which is bonded by coordinate bonds. This dehydration can advantageously be carried out thermally, for example by the process described in Makromol. Chem. 190 (1989), 929. Another possible method for dehydrating the heteropoly acids comprises dissolving the heteropoly acid in an organic solvent, for example in a dialkyl ether or alcohol, displacing the water from its coordinate bond to the heteropoly acid by means of the organic solvent and distilling it off azeotropically with the solvent, the method depending on the heteropoly acid used. Anhydrous heteropoly acids prepared by these methods can be used directly as a catalyst in the novel process.

The heteropoly acid catalysts can also be used in the form of heterogeneous catalysts in the novel process. For this process, the heteropoly acid is advantageously applied to a carrier which is inert under the reaction conditions, such as active carbon, silica, titanium dioxide or zirconium dioxide, by a conventional method, for example by impregnating the relevant carrier with a solution of the heteropoly acid in a solvent, preferably an organic solvent, and then drying it at from 100° to 300° C. preferably from 130° to 250° C. under reduced pressure until water is no longer detectable in the catalyst.

For the preparation of the polyoxyalkylene glycol monoethers, it is possible in principle to use all types of monohydric alcohols, such as aliphatic and cycloaliphatic alcohols, for example cyclohexanol, and aromatic and araliphatic alcohols, for example benzyl alcohol. These may furthermore carry substituents which are inert under the reaction conditions, such as alkyl, halogen or alkoxy. Unsaturated, aliphatic or cycloaliphatic alcohols, for example crotyl alcohol or cyclohexenol, can also be reacted. In the novel process, however, monohydric, saturated, aliphatic, secondary or tertiary $C_3$–$C_{18}$-alcohols, in particular $C_3$–$C_8$-alcohols, are preferably used. The use of monohydric, secondary or tertiary $C_3$–$C_5$-alcohols, such as isopropanol, tert-butanol, 2-butanol, 2-pentanol or 2-methyl-2-butanol is particularly preferred. The use of the araliphatic alcohol benzyl alcohol is likewise particularly advantageous.

For the preparation of the polyoxyalkylene glycol monoesters, it is possible in principle to use all types of monocarboxylic acids, such as aliphatic, cycloaliphatic, aromatic and araliphatic carboxylic acids. These may furthermore carry substituents which are inert under the reaction conditions, such as alkyl groups, halogen atoms or ether groups. Unsaturated aliphatic or cycloaliphatic carboxylic acids may also advantageously be reacted.

In the novel process, however, aliphatic $C_1$–$C_{18}$-monocarboxylic acids and aromatic monocarboxylic acids, such as benzoic acid, are advantageously used. Aliphatic $C_1$–$C_8$-monocarboxylic acids and benzoic acid are preferably used. The use of $C_1$–$C_4$-monocarboxylic acids, such as formic acid, acetic acid, propionic acid, butyric acid, pivalic acid, acrylic acid or methacrylic acid, is particularly preferred.

The term average molecular weight or average molecular mass is understood here as meaning the number average $M_n$ of the molecular weight of the polymers present in the product formed.

The alcohol or the carboxylic acid content of the reaction mixture influences the average molecular weight of the resulting polymer. As a rule, the higher the content of monohydric alcohol or of monocarboxylic acid in the reaction mixture, the lower is the average molecular weight of the resulting polymer. Accordingly, the average molecular weight of the polymer produced increases with decreasing alcohol or carboxylic acid content of the reaction mixture. At very low alcohol or carboxylic acid contents of the reaction mixture, larger amounts of cyclic oxyalkylene oligomers are formed.

The alcohol or carboxylic acid content of the reaction mixture also influences the phase behavior of said mixture. At high alcohol or carboxylic acid contents, the reaction mixture consists of a homogeneous phase, making it more difficult to separate off the catalyst subsequently during working up. At very low alcohol or carboxylic acid contents, the heteropoly acid is no longer completely dissolved by the reaction mixture. In the novel process, it is preferable to use alcohol or carboxylic acid contents of the reaction mixture at which two homogeneous, liquid phases form in the reaction mixture, the heavier lower phase containing the major part of the heteropoly acid catalyst and the alcohol or the carboxylic acid, in addition to monomeric starting material and freshly formed polymer, and the lighter, upper phase essentially being composed of the monomeric starting material and polymer dissolved therein, in addition to residual amounts of alcohol or carboxylic acid and catalyst.

In the batchwise embodiment of the novel process, in particular, it is advantageous to use alcohol or carboxylic acid contents of from 0.1 to 15, preferably from 1 to 8, mol of alcohol or carboxylic acid per mole of heteropoly acid. Since, when the novel process is carried out continuously, some of the alcohol or carboxylic acid dissolved in the upper, essentially product- and monomer-containing phase is discharged continuously from the reactor together with the product, but the alcohol or carboxylic acid present in the lower, essentially catalyst-containing phase is consumed in the preparation of the polyoxyalkylene glycol monoether or monoester, it is advantageous to control the alcohol or carboxylic acid supply to the reaction mixture, for replenishing the alcohol or carboxylic acid consumed and discharged, in such a way that the abovementioned concentration ratios in the catalyst phase are established. Under these conditions, the reaction system described above and consisting of two homogeneous, liquid phases is formed, in which polyoxyalkylene glycol monoethers or monoesters having virtually any average molecular weight, in particular, however, polyoxyalkylene glycol monoethers or monoesters having average molecular weights of more than 500 dalton and particularly preferably the polyoxyalkylene glycol monoethers or monoesters having the economically particularly important average molecular weights of from 600 to 3,500 dalton, can be prepared in a controlled manner and with good selectivity.

We have found that, for the preparation of polyoxyalkylene glycol monoethers or monoesters having certain average molecular weights, for example average molecular weights of from 500 to 3,500, and a narrow molecular weight distribution, it is particularly advantageous in the continuous process if the alcohol or carboxylic acid concentration, required for the preparation of such a polymer, in the catalyst phase is kept as constant as possible. In the continuous process, it is therefore advantageous to adopt a procedure in which the alcohol or the carboxylic acid in the reaction mixture is replenished continuously, according to its consumption in the reaction and taking into account the alcohol or carboxylic acid discharged with the product-containing upper phase, by supplying fresh or recycled alcohol or carboxylic acid, in a manner such that the alcohol concentration in the catalyst phase is kept substantially constant. In the batchwise embodiment of the novel process, of course, the abovementioned factors generally do not have such a critical effect on the result of the process as in the continuous process.

However, there was to date no reliable method for measuring the alcohol or carboxylic acid concentration in the concentrated heteropoly acid-containing catalyst phase; in particular, there was no method of measurement by which the alcohol or the carboxylic acid concentration in this catalyst phase could be measured sufficiently rapidly and accurately in order to be able to control the feed of fresh alcohol or fresh carboxylic acid according to the requirements of a continuous, industrial process via a coupled analog control.

We have found that the concentration of the alcohol or the carboxylic acid in the catalyst phase can be advantageously determined by measuring the electrical conductivity of the liquid catalyst phase. The electrical conductivity can be measured in the novel process, for example, with the aid of the methods, circuits and measuring arrangements as described by T. and L. Shedlovsky in A. Weissburger, B. W. Rossiter (Ed.) Techniques of Chemistry, Volume I, pages 163–204, Wiley-Interscience, New York, 1971. The concentration of the relevant alcohol or of the relevant carboxylic acid in the catalyst phase can be determined simply with the aid of the conductivity value obtained, with reference to a previously prepared calibration curve. As a rule, it is advantageous to prepare individual calibration curves for the different alcohol or carboxylic acid/heteropoly acid systems used. Since the conductivity measurement is an electrical measuring method, the measuring means can be coupled in a very simple manner to the alcohol or carboxylic acid metering apparatus for analog control of the alcohol or carboxylic acid addition. This combined measuring and metering method has a very advantageous effect on the product quality, particularly in the continuous embodiment of the novel process.

The average molecular weight of the polyoxyalkylene monoether or monoester formed in the novel process is not dependent solely on the amount of added heteropoly acid catalyst and of the alcohol or of the carboxylic acid but is also influenced by the type of heteropoly acid used and the type of alcohol or carboxylic acid employed.

For example, under otherwise identical conditions, the reaction of THF and isopropanol with anhydrous dodecatungstatophosphoric acid gives a polymer having an average molecular weight of 1,900, whereas the use of dodecatungstatosilicic acid results in a polymer having an average molecular weight of 1,500 and the use of ethanol as the monohydric alcohol gives poly-THF monoethyl ether having an average molecular weight of 1,900, while a poly-THF monohexadecyl ether having an average molecular weight of 3,600 is formed when hexadecan-1-ol is used.

By varying the amount and type of heteropoly acid used or of the monohydric alcohol, it is possible to prepare tailor-made polyoxyalkylene glycol monoethers having a certain average molecular weight and at the same time a relatively narrow molecular weight distribution. As a rule, these process parameters can be optimized by a few routine experiments.

Similarly, under otherwise identical conditions, the reaction of THF and formic acid with anhydrous dodecatungstatophosphoric acid gives a polymer having an average molecular weight of 1,500, whereas a polymer having an average molecular weight of 2,900 is formed when benzoic acid is used and the use of acetic acid as the carboxylic acid together with dodecamolybdatophosphoric acid gives a poly-THF monoacetate having an average molecular weight of 1,800, while a poly-THF monoacetate having an average molecular weight of 2,000 is formed when dodecatungstatosllicic acid is used.

By varying the reaction parameters amount, type of heteropoly acid used and carboxylic acid, it is thus possible also to prepare tailor-made polyoxyalkylene glycol monoesters having a certain average molecular weight and at the same time a relatively narrow molecular weight distribution.

The novel process can be carried out continuously or batchwise. Advantageously, the heteropoly acid is used for this purpose in amounts of from 10 to 300, preferably from 50 to 150, parts by weight per 100 parts by weight of the monomer mixture used or 100 parts by weight of tetrahydrofuran. It is also possible to use larger amounts of the heteropoly acid catalyst.

Heteropoly acid can be added in solid form to the reaction, after which, as a result of being brought into contact with the other reactants, it is gradually solvated with formation of the liquid catalyst phase. It is also possible to adopt a procedure in which the solid heteropoly acid is made into a slurry with the alcohol or carboxylic acid to be used and/or with the monomer to be employed, and to pass the resulting catalyst solution and liquid catalyst phase into the reactor. Both the catalyst phase and the monomeric starting material can be initially taken in the reactor. However, both components may also be passed simultaneously into the reactor.

The polymerization is usually carried out at from 0° to 150° C., preferably from 30° to 80° C., advantageously under atmospheric pressure, although the reaction under superatmospheric pressure, chiefly under the autogenous pressure of the reaction system, may also prove advantageous.

Since the polymerization is preferably carried out in a two-phase system, it is necessary to ensure thorough mixing of the two phases. For this purpose, it is necessary for the reactors to be equipped with efficient mixing means, for example stirrers, in both the batchwise and the continuous procedure. In the batchwise process, a stirred kettle is generally used for this purpose, the two liquid phases being separated from one another after the end of the reaction.

However, the continuous procedure is preferably used. In this, the reaction can be carried out in conventional reactors or reactor arrangements which are suitable for continuous processes for example in tube reactors which are equipped with internal fitments which ensure thorough mixing of the two-phase system or in stirred kettle cascades, the reaction being followed by continuous removal of the catalyst phase from the monomer- and product-containing upper phase. In the novel process, an apparatus as shown schematically in the Figure is advantageously used.

BRIEF DESCRIPTION OF THE DRAWING

The Figure is an apparatus used in the invention.

This apparatus is a stirred kettle 1 which is combined with a phase separator 2, is of otherwise conventional design, can be equipped with an external or internal heating means and as a rule is provided with separate inlet connections 5 for feeding in the individual reactants and flushing with inert gas. In the Figure, for the sake of clarity, the kettle heating is not shown and only one inlet connection 5, representing all others, is drawn. Furthermore, an apparatus for pressure equilibration 6 and an outlet connection 7 are mounted on the reactor. All these apparatuses are provided with separate control apparatuses 8, 9 and 10, for example slide valves or valves which permit the opening and closing of these connections and the regulation of the feed. The reactor is provided with a stirrer 12 which is connected to the outside by the guide 11 sealed with the bush 13. The stirred kettle 1 is connected to the phase separator 2 via the feeds 3 and 4 mounted roughly at the height of the upper and lower third, respectively. The product solution obtained in the reaction is discharged from the apparatus via the outlet connection 18, which is advantageously mounted above the feed 3. The outflow of product solution is controlled via the control apparatus 19, which may be, for example, a slide valve or a valve.

To operate this continuous apparatus, the reactants are initially taken in the reactor and thoroughly mixed at the desired reaction temperature by means of the stirrer 12, an emulsion-like mixture of the catalyst phase and the upper phase being formed. The flow produced in the reaction mixture by the stirrer results in the emulsion-like mixture passing via feed 3 into the phase separator 2, in which the catalyst phase and the monomer- and product-containing upper phase separate owing to their different densities. The clear, colorless product-containing upper phase and the clear catalyst phase, which may have different colors depending on the heteropoly acid used, separate out roughly above the line 16 and below the line 17. The product phase is taken off via outflow 18 while the catalyst phase flows back into the stirred kettle via the feed 4, owing to the suction produced by the stirrer 12, and is again thoroughly mixed with the monomer- and product-containing upper phase in said kettle. The lines 14 and 15 denote the rough liquid meniscus or level in the stirred kettle or phase separator during operation. Fresh monomer and fresh alcohol or fresh carboxylic acid are introduced into the stirred kettle via filling connections 5. The alcohol or carboxylic acid feed is controlled with the aid of the conductivity measuring cell 20 immersed in the liquid catalyst phase, in such a way that the desired alcohol or carboxylic acid content in the catalyst phase is kept constant within the accuracy of control.

Fresh monomer is usually metered into the reactor under control by a level controller. Advantageously, fresh monomer is fed in at the rate at which product and unconverted monomer are discharged from the reaction apparatus. In this way, it is also possible to control the residence time and consequently the polymerization time, and this provides a further means for influencing and adjusting the average molecular weight of the resulting polymer. Depending on the amount of catalyst and the reaction temperature, the polymerization is generally carried out in the batchwise process for a period of from 0.5 to 50, preferably from 1 to 10, particularly preferably from 1 to 8, hours. In the continuous process, residence times of from 1 to 8, preferably from 2 to 5, hours are usually established. At the beginning of the continuous reaction, the reaction system described requires a certain time before a steady-state equilibrium is established, during which time it may be advantageous to keep outlet 18 closed with the aid of control apparatus 19, ie. not to discharge any product solution from the reaction apparatus.

The catalyst phase remains in the reaction apparatus and is replenished continuously by adding fresh catalyst and/or, where relevant, by recycling discharged catalyst, according to the catalyst losses arising from the discharge of small amounts of catalyst with the product-containing upper phase.

If a heterogeneous heteropoly acid catalyst is used for the preparation of the poly-THF monoether or monoester, said catalyst can be employed as a suspended catalyst, but preferably as a fixed-bed catalyst. When a fixed-bed catalyst is used, the reaction mixture may be passed over the heterogeneous heteropoly acid catalyst by the liquid phase or trickle bed procedure.

The process for the novel preparation of the poly-THF monoethers or monoesters is advantageously carried out under an inert gas atmosphere, and any inert gases, such as nitrogen or argon, can be used. Before being used, the reactant is freed from any water and peroxides present therein.

The addition of organic solvents which are inert under the reaction conditions, for example aliphatic and aromatic hydrocarbons and halohydrocarbons, is possible and may be advantageous in that separation of the catalyst and upper phase is facilitated. As a rule, the monomer serves both as a reactant and as a solvent in the novel process.

The polymer-containing upper phase can be further processed directly, ie. without additional working-up, to give the relevant polyoxyalkylene glycols, but the poly-THF monoethers or monoesters present therein may also be isolated before their further processing in the novel process in a particular working-up stage.

The polymer-containing upper phase can be worked up, for example, by a method in which traces of heteropoly acid present therein are neutralized by adding a base, for example an alkali metal or alkaline earth metal hydroxide solution, ammonia, an alkali metal or alkaline earth metal carbonate solution or bicarbonate solution, the monomer present therein is distilled off and the polyoxyalkylene glycol monoether or monoester remaining in the distillation residue is filtered to separate off precipitated salts. The monomer recovered during the distillation can of course be recycled to the reaction.

Polyoxyalkylene glycol monoethers or monoesters obtainable in this manner or the polymer-containing upper phase containing them and discharged from the polymerization reactor can then be converted into the relevant polyoxyalkylene glycols by cleaving the monoether or monoester bond.

Both the monoether and the monoester groups can be eliminated from the polyoxyalkylene radical in a variety of ways.

The conversion of the polyoxyalkylene glycol monoethers into the relevant polyoxyalkylene glycols can, for example, advantageously be catalyzed with the aid of acidic catalysts, such as Brönstedt or Lewis acids. Suitable Lewis acids are, for example, boron trihalide etherates or alcoholates, titanium tetrachloride, zirconium tetrachloride, tin(II) chloride, silicon tetrachloride and zinc chloride.

Brönstedt acids or solids acting as Brönstedt acids are preferably used for this purpose. The following classes are examples of these:

Acidic ion exchangers, such as sulfonated styrene/divinylbenzene resins, sulfonated phenol/formaldehyde resins, Nafion ® resins, sulfonated carbons, silicates, such as montmorillonites, bleaching earths, clay minerals, natural zeolites, such as faujasites, erionires, chabasites and mordenites, synthetic zeolites, such as the A, L, X, Y and T type zeolites and the pentasils, nonoxidizing mineral acids, such as hydrofluoric acid, hydrochloric acid, diluted sulfuric acid, phosphoric acid, tetrafluoboric acid, carboxylic acids, such as formic acid, trichloroacetic acid or trifluoroacetic acid, organic sulfonic acids, such as methanesulfonic acid, benzenesulfonic acid, toluenesulfonic acid, 4-bromobenzenesulfonic acid, 4-trifluoromethylbenzenesulfonic acid or trifluoromethylsulfonic acid, cationic acids, such as aqueous iron(II) sulfate, copper(II) sulfate, zinc sulfate, iron(II) chloride or aluminum sulfate solutions, acidic salts, such as potassium bisulfate, sodium bisulfate or sodium dihydrogen phosphate, acidic aluminum phosphates or aqueous solutions thereof, as well as heteropoly acids, such as those which can be used as catalysts for the polymerization of cyclic ethers.

When using these acids, it should be ensured that they are not used in too high a concentration relative to the relevant polyoxyalkylene glycol derivative, so that no significant depolymerization of the polyoxyalkylene glycols occurs. The concentrations to be used differ from acid to acid, and the optimum concentration for the particular acid used can be determined on the basis of a few simple preliminary experiments.

Hydrochloric acid, sulfuric acid, phosphoric acid and acidic ion exchangers, bleaching earths, clay minerals and the heteropoly acids used for the polymerization are particularly preferably used in the novel process. Polyoxyalkylene glycol monoethers advantageously used for the preparation of the relevant polyoxyalkylene glycols are those whose monoether group is derived from a secondary or tertiary alcohol, in particular from isopropanol or tert-butanol, or from benzyl alcohol. The relevant polyoxyalkylene glycols can be liberated particularly easily from the polyoxyalkylene glycol tert-butyl or benzyl ethers by acid catalysis. The polyoxyalkylene glycol monoethers together with secondary or tertiary alcohols give, in addition to the desired polymeric glycol, mainly the olefins which are derived from these alcohols and can be separated off readily by distillation, in particular the olefins eliminated from the relevant isopropyl or tert-butyl ethers, ie. propene or isobutene, which, if desired, can be converted back into the relevant alcohols in a further stage by the addition of water and can be recycled to the polymerization reaction.

The cleavage of the monoether bond can be carried out batchwise, for example in the stirred kettle, or continuously, for example in a tube reactor. In the continuous embodiment of the process, solid, acidic catalysts, such as ion exchanger, bleaching earths, clay minerals, etc., are preferably used and are preferably installed in the reactor as a fixed-bed arrangement, with the result that it is possible to dispense with a process stage for separating off the catalyst.

Liberation of the polyoxyalkylene glycol from its monoether derivative is carried out particularly advantageously if it is catalyzed by traces of heteropoly acid catalyst which may still be present in the discharge from the polymerization reaction. The cleavage of the monoether bond is catalyzed by the heteropoly acid under the conditions which are required for separating off the monomer and the residual alcohol by distillation, and the desired polyoxyalkylene glycol is obtained as a bottom product of the distillation. The traces of heteropoly acid present therein can be removed therefrom without great expense, for example by means of ion exchangers or by extraction with water after neutralization.

Otherwise, the monoether group can be cleaved at 0°–200° C., in particular 70°–150° C., under atmospheric pressure or under the autogenous pressure of the reaction system, but preferably under reduced pressure, in particular from 0.1 to 100 mbar. The ether cleavage can be effected in the presence or absence of solvents which are inert under the reaction conditions, such as water, alcohols or halohydrocarbons.

If polyoxyalkylene glycol benzyl ethers are used as intermediates for the preparation of the polyoxyalkylene glycols in the novel process, they can, if desired, also be liberated from the relevant benzyl ether by hydrogenolysis, toluene being formed from the benzyl group. Conventional hydrogenation catalysts, such as Raney nickel, Raney cobalt, platinum or palladium, which, if desired, may be applied to a carrier, such as active carbon, can be used for this process, which takes place under particularly mild conditions. A hydrogen pressure of from 1 to 350, in particular from 1 to 10, bar and temperatures of from 0° to 200° C., in particular from 20° to 50° C., are advantageously used.

The polyoxyalkylene glycol monoesters prepared according to the invention can likewise be cleaved under acid catalysis to give the relevant polyoxyalkylene glycols. This is preferably carried out in the presence of water or of an alcohol, in particular a $C_1$–$C_4$-alcohol, the relevant polyoxyalkylene glycol monoester being hydrolyzed to the polymeric glycol and the relevant carboxylic acid or being transesterified to the polymeric glycol and the relevant low molecular weight carboxylic ester. The carboxylic acid liberated in this procedure can be separated off from the polyoxyalkylene glycol by distillation and, if desired, recycled to the polymerization reaction, but may also be extracted from the polyoxyalkylene glycol by means of ion exchangers or after neutralization with a base. The low molecular weight carboxylic esters formed again in the transesterification are preferably removed from the reaction mixture by distillation.

The acid-catalyzed polyoxyalkylene glycol monoester hydrolysis or transesterification can be carried out at from 0° to 300° C., in particular from 70° to 150° C., under atmospheric pressure or the autogenous pressure of the reaction system, but preferably under reduced pressure, in particular from 0.1 to 100 mbar.

However, the polyoxyalkylene glycol monoesters prepared according to the invention are preferably hydrolyzed by means of mineral bases, such as the aqueous solutions of the alkali metal hydroxides, alkali metal carbonates, alkaline earth metal hydroxides or carbonates, or aqueous ammoniacal solutions, not only the desired polyoxyalkylene glycols being obtained but also the corresponding carboxylates. Said carboxylates can be removed by treating the hydrolysis products with conventional ion exchangers or by extraction with water. The alkaline hydrolysis of the polyoxyalkylene glycol monoesters is advantageously carried out at from 0° to 150° C., in particular from 20° to 80° C., under atmospheric pressure or the autogenous pressure of the reaction system.

The polyoxyalkylene glycol monoesters can also advantageously be subjected to solvolysis in nonaqueous alcoholic solutions in the presence of alkali metal alcoholates as catalysts. The alkali metal alcoholates can be added as such to the reaction mixture or can be produced in situ, for example by reacting an alkali metal or an alkali metal hydride with the alcoholic reaction solution. The type of alkali metal component is as a rule not critical for the success of the reaction. An advantageously used alcoholic component is the alcoholate of the alcoholic solvent used. Lower alcohols, such as $C_1$-$C_{10}$-alcohols, in particular $C_1$-$C_4$-alcohols, most preferably methanol, are suitable as alcoholic solvents and simultaneously as reactants in this solvolysis process. The alcohols are used in amounts of from 0.1 to 20, advantageously from 1 to 5%, by weight, based on the polyoxyalkylene glycol monoester. The solvolysis can be carried out in the presence of solvents which are inert under the reaction conditions. The lower molecular weight esters formed in the course of the transesterification are advantageously distilled off continuously from the solvolysis mixture, and it is possible to use atmospheric or reduced pressure. The polyoxyalkylene glycol monoester solvolysis catalyzed by an alkali metal alcoholate can be carried out at from 0° to 150° C., preferably from 20° to 100° C., under atmospheric pressure, the autogenous pressure of the reaction system or, preferably, reduced pressure. After the end of the solvolysis, the alcoholate catalyst can be hydrolyzed and the reaction mixture worked up by a conventional method.

Furthermore, the polyoxyalkylene glycols can be liberated from the polyoxyalkylene glycol monoesters prepared according to the invention by hydrogenolysis. In addition to the polyoxyalkylene glycols, the corresponding monohydric alcohols are formed from the carboxylic acids in question by a reduction and can be distilled off from the hydrogenation mixture. The polyoxyalkylene glycol monoesters are, as a rule, hydrogenated at from 100° to 300° C., in particular from 150° to 250° C., hydrogen pressures of from 50 to 350, preferably from 150 to 300, bar being used. Suitable hydrogenation catalysts are conventional hydrogenation catalysts, such as Raney nickel, Raney cobalt, platinum or palladium, which may, if desired, be applied to a carrier, such as active carbon, or the hydrogenation catalysts described in EP-A 158 835 and Houben-Weyl, Methoden der organischen Chemie, Vol. 4/2, 4th Edition, pages 318–322, Thieme, Stuttgart, 1955.

A particular possibility for liberating the polyoxyalkylene glycols from their monoesters consists in decarbonylation of the polyoxyalkylene glycol monoformates. This decarbonylation can advantageously be carried out by conventional methods, for example the process of EP-A 115 387.

Whether it is carried out by acidic or alkaline hydrolysis, by transesterification, by decarbonylation or by hydrogenolysis, the ester cleavage of the polyoxyalkylene glycol monoesters prepared according to the invention can in all cases be effected batchwise or continuously in reactors usually used for the relevant procedure, for example in stirred kettles, loop reactors or stirred autoclaves for the batchwise procedure or in tube reactors or reactor cascades for the continuous procedure.

The novel process gives THF-based polyoxyalkylene glycols, in particular poly-THF, having a very low color number. Since these polyoxyalkylene glycols are liberated in the novel process from the relevant polyoxyalkylene glycol monoethers or monoesters prepared according to the invention, which in turn are obtainable by the novel procedure with a specific average molecular weight and with a narrow molecular weight distribution, the novel process permits for the first time the controlled, economical preparation of polyoxyalkylene glycols having certain average molecular weights and having a narrow molecular weight distribution.

EXAMPLES

The average molecular weights ($M_n$) of the polymers prepared according to the Examples were determined by gel permeation chromatography, a standardized polystyrene being used for calibration. The number average molecular weight $M_n$ was calculated from the resulting chromatograms using the equation $$M_n = \frac{\Sigma c_i}{\frac{\Sigma c_i}{M_1}}$$

where $c_i$ is the concentration of the individual polymer species i in the resulting polymer mixture, $M_i$ is the molecular weight of the individual polymer species i. The molecular weight distribution, referred to below as the dispersity D, was calculated from the ratio of the weight average molecular weight ($M_w$) to the number average molecular weight ($M_n$) using the equation $$\frac{M_w}{M_n} = D$$

The weight average molecular weight $M_w$ was determined from the resulting chromatograms with the aid of the formula $$M_w = \frac{\Sigma c_i M_1}{\Sigma c_i}$$

The samples used for determining the dispersity had not, as is generally the case, been subjected to preliminary molecular distillation to remove volatile, short-chain polymers, so that the value for D determined was higher than would have been expected after a preliminary molecular distillation.

All reactants used for the preparation of the polyoxyalkylene glycol monoethers or monoesters were anhydrous and peroxide-free.

EXAMPLE 1

100 g of THF, 2.4 g of tert-butanol and 50 g of anhydrous dodecatungstatophosphoric acid were thoroughly mixed for 4 hours at 60° C. under an argon atmosphere in a glass flask provided with a stirrer and reflux condenser. After cooling to room temperature, the polymer-containing upper phase was separated from the catalyst, and the upper phase was distilled to remove THF and tert-butanol. 15 g of polyoxybutylene glycol mono-tert-butyl ether remained.

The resulting polymer was freed from heteropoly acid residues by extraction with dilute aqueous sodium hydroxide solution, the polymer was washed neutral, 1% by weight of Tonsil ® (acid-activated calcium bentonite from Süd-Chemie) was added and heating was carried out for 1 hour at 130° C. under 0.5 mbar while stirring. The Tonsil ® was then filtered off. During this treatment, the polyoxybutylene glycol mono-tert-butyl ether was converted quantitatively into polyoxybutylene glycol. The average molecular weight ($M_n$) of the resulting polyoxybutylene glycol was 2,200 and its dispersity D was 1.8.

EXAMPLE 2

1,000 g of THF which contained 8% by weight of tert-butanol was thoroughly stirred with 500 g of anhydrous dodecatungstatophosphoric acid for 4 hours at 60° C. under a nitrogen atmosphere in an apparatus shown in the Figure. Thereafter, 250 g/hour of THF which contained 2% by weight of tert-butanol were fed into the reactor at 60° C. while stirring, and the same amount of upper phase was discharged from the reactor. The THF conversion was 13%. The reacted mixture was freed from THF and tert-butanol by distillation, and the clear, viscous polyoxybutylene glycol mono-tert-butyl ether obtained as a bottom product and still containing residual amounts of dodecatungstatophosphoric acid was then heated at 80° C. for 1 hour under 0.5 mbar. During this treatment, the polyoxybutylene glycol mono-tert-butyl ether used was converted into polyoxybutylene glycol having an average molecular weight ($M_n$) of 2,400 and a dispersity of 1.7, which was obtained in virtually quantitative yield after neutralization and extraction of the heteropoly acid by means of dilute sodium hydroxide solution.

EXAMPLE 3

1,000 g of THF which contained 10% by weight of acetic acid was stirred with 500 g of anhydrous dodecatungstatosilicic acid for 4 hours at 60° C. under a nitrogen atmosphere in an apparatus as shown in the Figure. Thereafter, 250 g/hour of THF which contained 3.5% by weight of acetic acid were fed into the reactor, and the same amount of upper phase was discharged from the reactor. The THF conversion was 12%. The reacted mixture was distilled under reduced pressure to remove residual THF and acetic acid.

The same volume of methanol and an amount of sodium methylate sufficient to form a clearly alkaline solution were added to the resulting polyoxybutylene glycol monoacetate. This mixture was heated in a distillation apparatus, and the methyl acetate formed was distilled off continuously from the reaction mixture. After the end of the transesterification, the reaction mixture was neutralized with phosphoric acid, the residual methanol was distilled off and the polymeric residue was filtered to remove insoluble salts. The average molecular weight of the resulting polyoxybutylene glycol was determined by establishing the hydroxyl number (OH number, Deutsches Arzneimittelbuch, 7th Edition, Section V 3.4.3) and was 966. Its dispersity was 1.7.

EXAMPLE 4

The procedure described in Example 3 was followed, except that 500 g of anhydrous dodecatungstatophosphoric acid were used instead of the dodecatungstatosilicic acid. Working-up was carried out similarly to Example 3. The average molecular weight of the resulting polyoxybutylene glycol was determined by establishing the OH number and was 1,056. The poly-THF was obtained in a yield of 21%.

We claim:

1. A process for the preparation of a polyoxyalkylene glycol having a narrow molecular weight distribution and a low color number, which comprises:
    polymerizing tetrahydrofuran or a mixture consisting of tetrahydrofuran with a total of not more than 95 mol %, based on the tetrahydrofuran used, of one or more comonomers selected from the group consisting of cyclic ethers and acetals, in the absence of water and in the presence of a monohydric alcohol and also in the presence of 10 to 300 parts by weight, per 100 parts by weight of the monomers used, of an acid catalyst consisting essentially of a solvated, anhydrous heteropolyacid, the content of the monohydric alcohol being chosen to form the reaction mixture into two homogeneous, liquid phases, wherein the lower heavier phase contains the major part of the heteropolyacid catalyst and of the alcohol in addition to monomeric starting material and freshly formed polymer and wherein the upper lighter phase is composed essentially of the monomeric starting material and polymer dissolved therein in addition to residual amounts of alcohol and catalyst; and
    liberating the polyoxyalkylene glycol from the resulting polyoxyalkylene glycol monoether by cleavage of the monoether bond.

2. A process as claimed in claim 1, wherein the polymerization reaction is carried out continuously in said two-phase system and an alcohol concentration of from 0.1 to 15 mol per mol of heteropolyacid is established in said lower heavier phase containing the major part of said catalyst.

3. A process as claimed in claim 2, wherein tetrahydrofuran is the sole monomer used in the polymerization step, and polyoxybutylene glycol is liberated from the resulting polyoxybutylene glycol monoether by cleavage of the monoether bond.

4. A process as claimed in claim 1, wherein a secondary or tertiary alcohol is used as the monohydric alcohol, and the polyoxyalkylene glycol is liberated from the resulting polyoxyalkylene glycol monoether with the aid of an acidic catalyst.

5. A process as claimed in claim 1, wherein tert-butanol is used as the monohydric alcohol, and the polyoxyalkylene glycol is liberated from the resulting polyoxyalkylene glycol mono-tert-butyl ether with the aid of an acidic catalyst.

6. A process as claimed in claim 1, wherein benzyl alcohol is used as the monohydric alcohol, and the polyoxyalkylene glycol is liberated from the resulting polyoxyalkylene glycol monobenzyl ether by hydrogenolysis.

7. A process as claimed in claim 1, wherein said tetrahydrofuran or said mixture is polymerized at a temperature of from 0° to 150° C.

8. A process for the preparation of a polyoxyalkylene glycol having a narrow molecular weight distribution and a low color number, which comprises:

polymerizing tetrahydrofuran or a mixture consisting of tetrahydrofuran with a total of not more than 95 mol %, based on the tetrahydrofuran used, of one or more comonomers selected from the group consisting of cyclic ethers and acetals, in the absence of water and in the presence of a monocarboxylic acid and also in the presence of 10 to 300 parts by weight, per 100 parts by weight of the monomers used, of an acid catalyst consisting essentially of a solvated, anhydrous heteropolyacid, the content of the monocarboxylic acid being chosen to form the reaction mixture into two homogeneous, liquid phases, wherein the lower heavier phase contains the major part of the heteropolyacid catalyst and or the carboxylic acid in addition to monomeric starting material and freshly formed polymer and wherein the upper lighter phase is composed essentially of the monomeric starting material and polymer dissolved therein in addition to residual amounts of carboxylic acid and catalyst; and liberating the polyoxyalkylene glycol from the resulting polyoxyalkylene glycol monoester by cleavage of the monoester bond.

9. A process as claimed in claim 8, wherein the polymerization reaction is carried out continuously in said two-phase system and a monocarboxylic acid concentration of from 0.1 to 15 mol per mol of heteropolyacid is established in said lower heavier phase containing the major part of said catalyst.

10. A process as claimed in claim 9, wherein tetrahydrofuran is the sole monomer used in the polymerization step, and polyoxybutylene glycol is liberated from the resulting polyoxybutylene glycol monoester by cleavage of the monoester bond.

11. A process as claimed in claim 8, wherein the polyoxyalkylene glycol is liberated from the resulting polyoxyalkylene glycol monoester by base-catalyzed or acid catalyzed solvolysis of the ester group.

12. A process as claimed in claim 8, wherein the polyoxyalkylene glycol is liberated from the resulting polyoxyalkylene glycol monoester by reduction of the ester group.

13. A process as claimed in claim 8, wherein the monocarboxylic acid is selected from the group consisting of aliphatic $C_1$-$C_8$-monocarboxylic acids and benzoic acid.

14. A process as claimed in claim 8, wherein said tetrahydrofuran or said mixture is polymerized at a temperature of from 0° to 150° C.

* * * * *

UNITED STATES PATENT AND TRADEMARK OFFICE
CERTIFICATE OF CORRECTION

PATENT NO. : 5,416,240
DATED : May 16, 1995
INVENTOR(S) : Weyer et al.

It is certified that error appears in the above-identified patent and that said Letters Patent is hereby corrected as shown below:

In claim 8, Column 15, line 31:  change "or" to --of--.

Signed and Sealed this

Fifth Day of September, 1995

Attest:

BRUCE LEHMAN

*Attesting Officer*        *Commissioner of Patents and Trademarks*